(12) United States Patent
Singh et al.

(10) Patent No.: US 7,237,816 B1
(45) Date of Patent: Jul. 3, 2007

(54) AUTOMOTIVE CENTER CONSOLE WITH OPEN FRONT FACE

(75) Inventors: Kaushlendra Singh, Canton, MI (US); Kenneth A. Stoner, Northville, MI (US); Mike J. Whitens, Novi, MI (US); Peter Bejin, Northville, MI (US)

(73) Assignees: Ford Global Technologies, LLC, Dearborn, MI (US); Visteon Corporation, Van Buren Township, MI (US)

( * ) Notice: Subject to any disclaimer, the term of this patent is extended or adjusted under 35 U.S.C. 154(b) by 186 days.

(21) Appl. No.: 11/145,604

(22) Filed: Jun. 6, 2005

Related U.S. Application Data

(60) Provisional application No. 60/669,726, filed on Apr. 8, 2005.

(51) Int. Cl.
*B60R 7/00* (2006.01)
(52) U.S. Cl. .................................... 296/24.34; 296/37.1
(58) Field of Classification Search ............. 296/24.34, 296/37.1, 37.8, 1.07
See application file for complete search history.

(56) References Cited

U.S. PATENT DOCUMENTS

| | | | |
|---|---|---|---|
| 5,085,481 A | 2/1992 | Fluharty | 296/37.8 |
| 6,206,260 B1 | 3/2001 | Covell | 224/539 |
| 6,231,098 B1 | 5/2001 | Schenk | 296/37.8 |
| 6,616,206 B2 * | 9/2003 | Luginbill et al. | 296/37.8 |
| 6,682,116 B1 * | 1/2004 | Okumura | 296/37.8 |
| 6,851,736 B1 * | 2/2005 | Klopp et al. | 296/37.8 |
| 7,029,048 B1 * | 4/2006 | Hicks et al. | 296/24.34 |
| 2002/0089203 A1 | 7/2002 | Flowerday | 296/37.8 |
| 2003/0155787 A1 * | 8/2003 | Lein et al. | 296/24.1 |
| 2006/0071497 A1 * | 4/2006 | Radu et al. | 296/24.34 |
| 2006/0220408 A1 * | 10/2006 | Hutek et al. | 296/37.8 |

* cited by examiner

*Primary Examiner*—Lori L. Lyjak
(74) *Attorney, Agent, or Firm*—Gigette M. Bejin; Miller Law Group, PLLC

(57) ABSTRACT

A center console for an automotive vehicle encloses an internal storage area accessible through an opening covered by a pivoted lid serving as an armrest. The vertical front face of the console immediately forwardly of the armrest is open to create an access opening that is greater than the opening covered merely by the pivoted lid. A removable storage tray seated in the upper portion of the storage area covers the open vertical front face of the console. The opening of the pivoted lid and the removal of the storage tray creates an access opening into the storage area that will accommodate the insertion of a laptop computer or a purse for hidden storage within the internal storage area of the center console. The latch mechanism is operable in conjunction with the removable storage tray to permit closure of the when the storage tray is removed from the console.

20 Claims, 10 Drawing Sheets

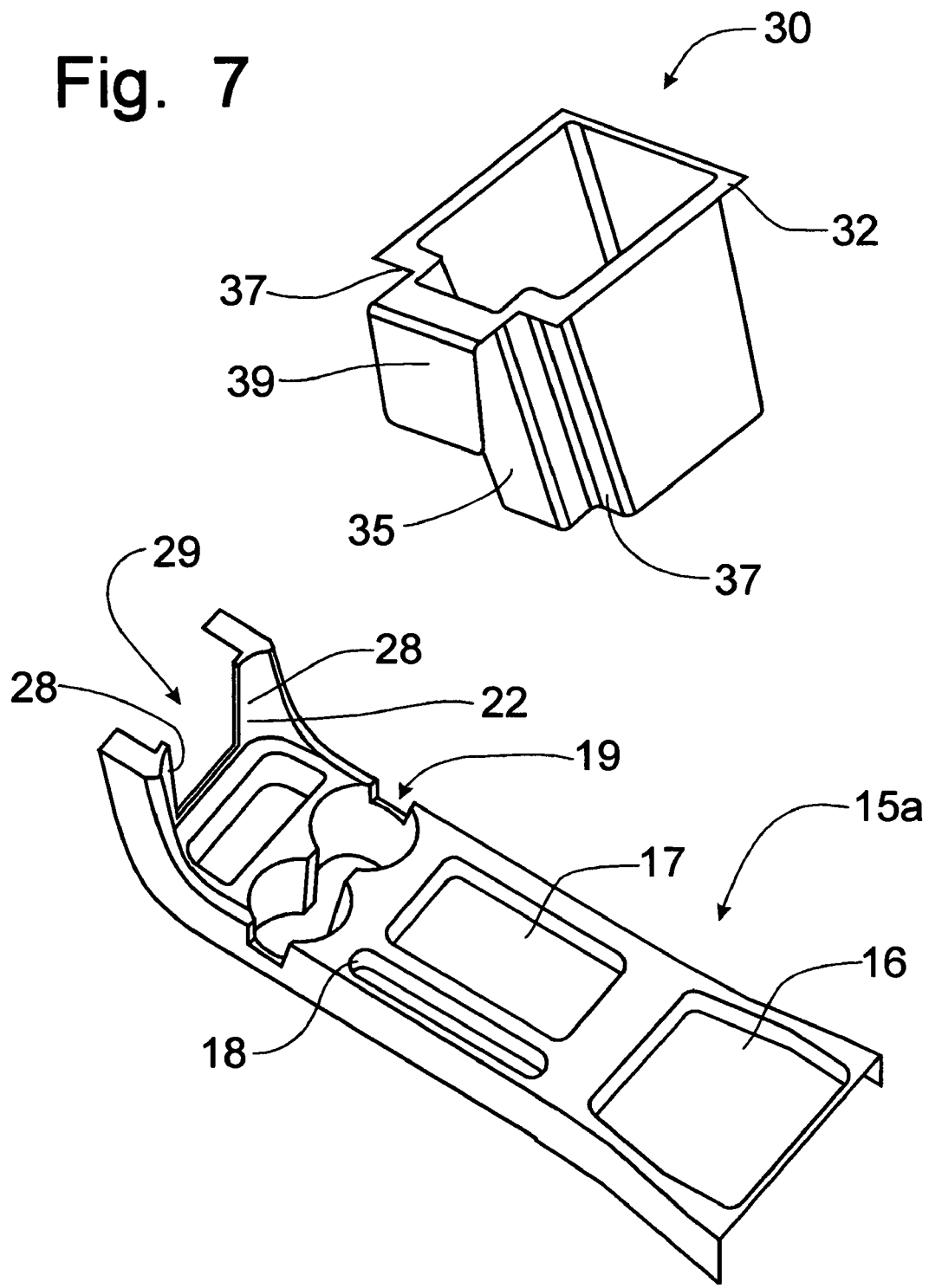

AUTOMOTIVE CENTER CONSOLE WITH OPEN FRONT FACE

CROSS-REFERENCE TO RELATED APPLICATIONS

This application claims domestic priority on U.S. Provisional Patent Application Ser. No. 60/669,726, filed on Apr. 8, 2005, the contents of which are incorporated herein by reference.

FIELD OF THE INVENTION

This invention relates to improving access into a center console of an automobile and, more particularly, to an open front face in a center console that is selectively closable with a movable device.

BACKGROUND OF THE INVENTION

Automotive vehicles are often equipped with a center console positioned between individual front driver and passenger seats. Center consoles are provided primarily for storage purposes and typically include a pivotally movable lid that opens up into a storage bin, which is usually sufficiently large to house music CD's, maps, keys and other loose miscellaneous items. Often cupholders are incorporated into the center console of an automobile. The provision of a cupholder and other spatial requirements can restrict the size of the lid and the opening the lid covers to permit access into the storage area of the center console. Even though the enclosed storage area may be large enough to fit a laptop computer or a purse, the storage area cannot accommodate such large items unless the opening is sufficiently large to permit the passage of these large items.

Center consoles are known in the prior art. An example of a console providing an enclosed storage area can be seen in U.S. Pat. No. 6,206,260, issued to Douglas G. Covell, et al on Mar. 27, 2001. In Covell, the front storage area is covered by a removable cupholder in one embodiment, although an optional lid is suggested. In another embodiment, Covell employs a cupholder between the first and second storage areas, though none of the sections are covered by a lid. In U.S. Pat. No. 6,616,206, issued on Sep. 9, 2003, to Neal W. Luginbill, et al, a cup holder is located between a rear storage area and a front storage area when the cupholder is located in the position suggested in FIG. 1. U.S. Patent Application Publication No. 2002/0089203, filed on behalf of Craig D. Flowerday and published Jul. 11, 2002, discloses a console compartment that accommodates a container. Sliding trays are open and allow access to the interior of the housing.

Other interior vehicle structure can be utilized to house storage areas, such as is found in U.S. Pat. No. 5,085,481, issued to William J. Fluharty, et al on Feb. 4, 1992, which discloses an armrest frame divided into three windows which serve as storage areas. U.S. Pat. No. 6,231,098, granted to Bernd Shenk on May 15, 2001, teaches a tunnel covering that forms first and second compartments in which a separate tray can be inserted into the front compartment.

It would be advantageous to provide a center console for an automotive vehicle, having an internal storage area sized to receive items larger than the lid-covered opening can permit passage of, in which the lid opens to create an access opening of a size commensurate with the size of the storage area to permit the passage of items that are larger than the size of the lid into the storage area.

SUMMARY OF THE INVENTION

It is an object of this invention to overcome the aforementioned disadvantages of the known prior art by providing a center console for an automotive vehicle in which the access opening into the internal storage area can be made larger than the size of the lid covering the storage area.

It is a feature of this invention that the storage compartment houses a removable storage tray that covers a forwardly facing opening.

It is another feature of this invention that the opening of the pivoted lid and the removal of the storage tray opens an access opening larger than the size of the pivoted lid to enhance access into the internal storage area of the center console.

It is an advantage of this invention that the pivoted lid covers an access opening into the removable storage tray.

It is another advantage of this invention that the opened pivoted lid and the removal of the storage tray creates an access opening sufficiently large to permit the passage of a laptop computer or other similarly large items.

It is another feature of this invention that a cupholder is built into the housing of the center console without interfering with the creation of an access opening sufficiently large to permit the passage of a laptop computer or other similarly large items.

It is still another advantage of this invention that the interior storage compartment of a center console is made more accessible.

It is yet another feature of this invention that the vertical front face of the center console immediately forward of the armrest serving as the lid for the storage area internally of the console.

It is still another feature of this invention that the latch mechanism for the pivoted lid of the center console is designed to permit the selective opening of the vertical front face of the console.

It is a further object of this invention to provide a center console for an automotive vehicle that is durable in construction, inexpensive of manufacture, carefree of maintenance, facile in assemblage, and simple and effective in use.

These and other objects, features and advantages are accomplished according to the instant invention by providing a center console for an automotive vehicle having an internal storage area accessible through an opening covered by a pivoted lid serving as an armrest. The vertical front face of the console immediately forwardly of the armrest is open to create an access opening that is greater than the opening covered merely by the pivoted lid. A removable storage tray seated in the upper portion of the storage area covers the open vertical front face of the console. The opening of the pivoted lid and the removal of the storage tray creates an access opening into the storage area that will accommodate the insertion of a laptop computer or a purse for hidden storage within the internal storage area of the center console. The latch mechanism is operable in conjunction with the removable storage tray to permit closure of the when the storage tray is removed from the console.

BRIEF DESCRIPTION OF THE DRAWINGS

The advantages of this invention will become apparent upon consideration of the following detailed disclosure of the invention, especially when taken in conjunction with the accompanying drawings wherein:

FIG. 6 is a right, front perspective view of the top surface molding forming part of the center console apparatus depicted in FIG. 2;

FIG. 7 is a upper, left, front perspective view of the removable storage bin deployed in the center console apparatus depicted in FIG. 3 to close the front face opening;

DETAILED DESCRIPTION OF THE PREFERRED EMBODIMENT

Figure 1:
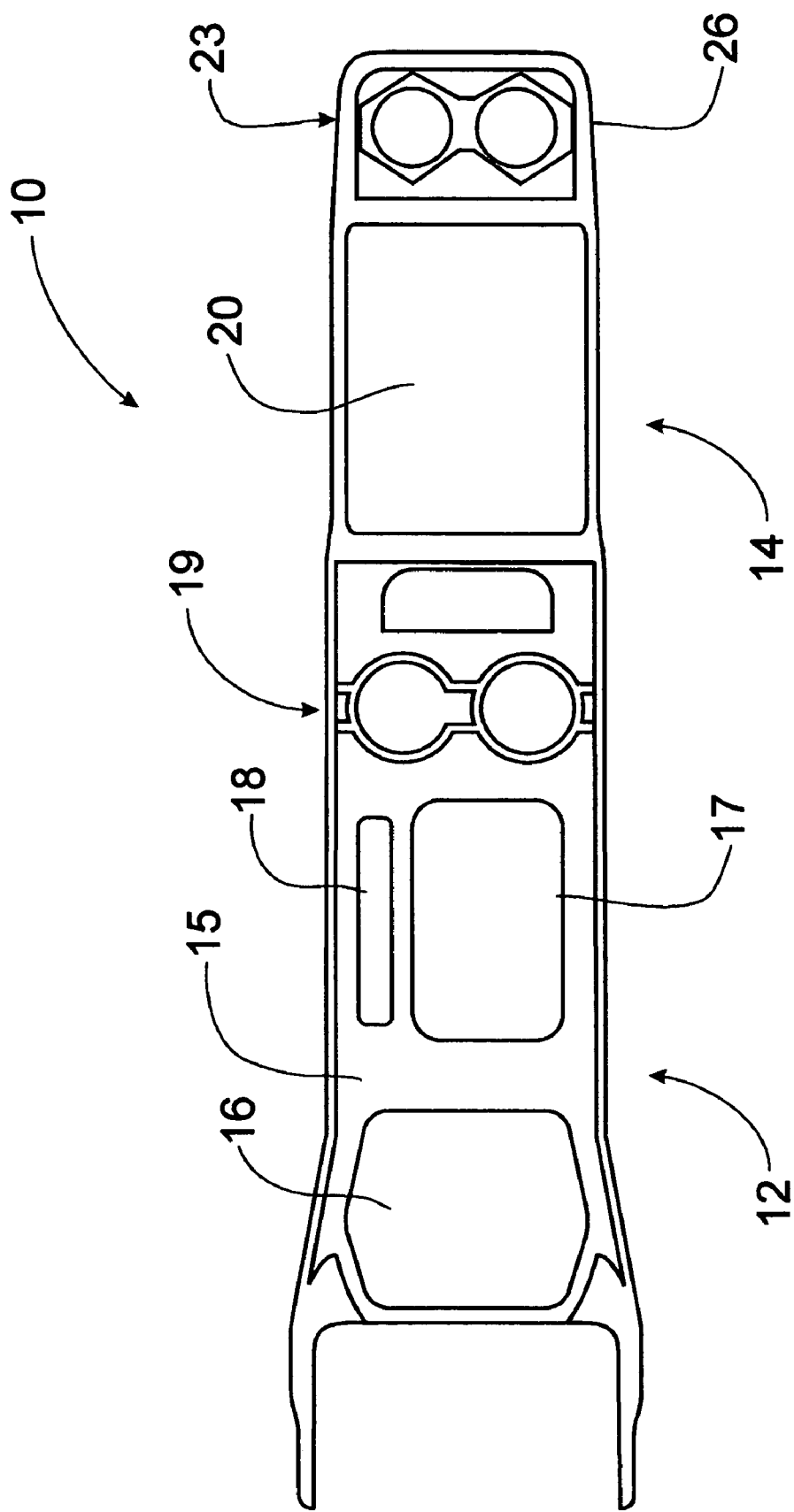
FIG. 1 is a top plan view of a center console for utilization in an automotive vehicle, incorporating the principles of the instant invention.
Figure 2:
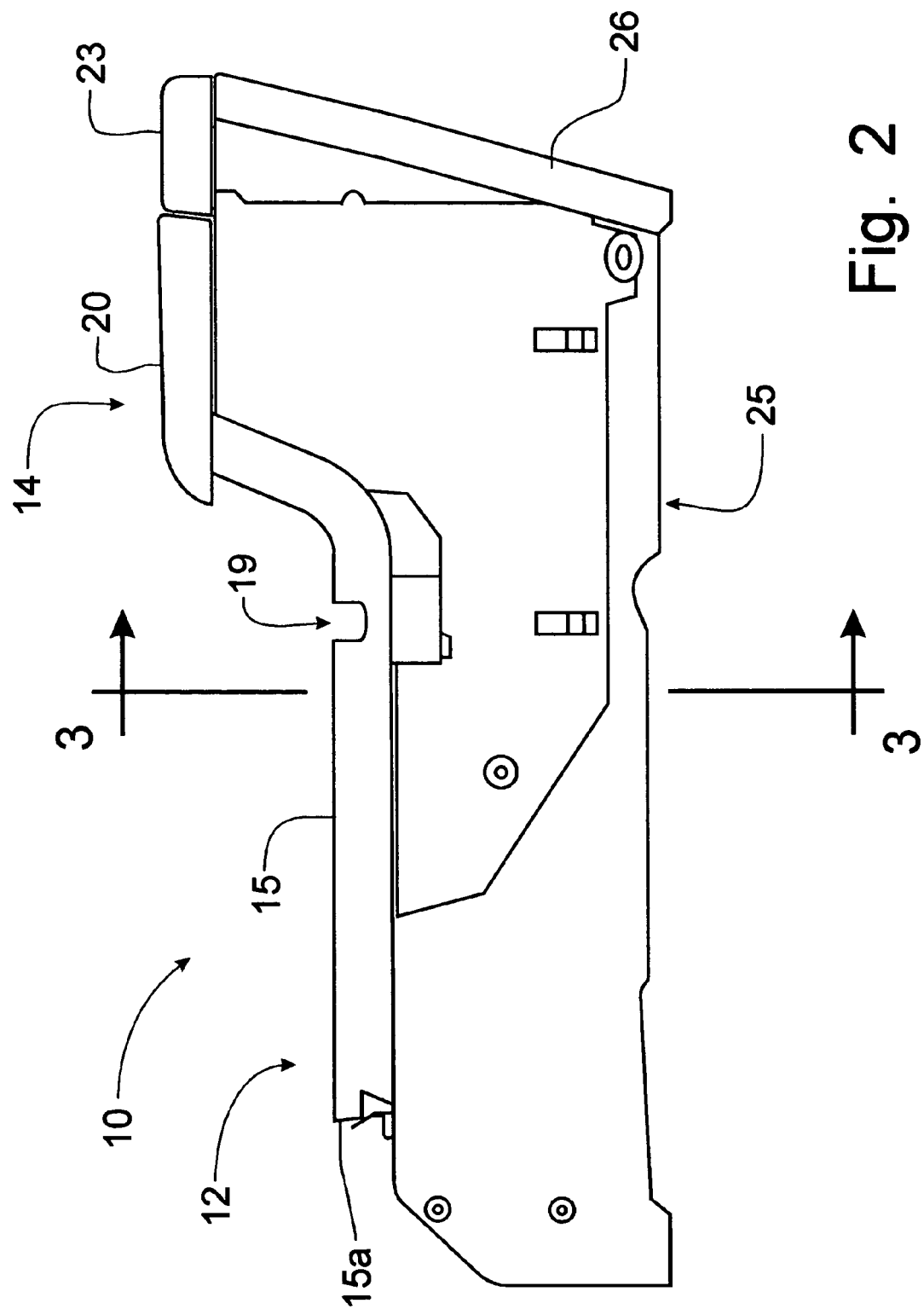
FIG. 2 is a side elevational view of the automotive center console apparatus depicted in FIG. 1.
Figure 4:
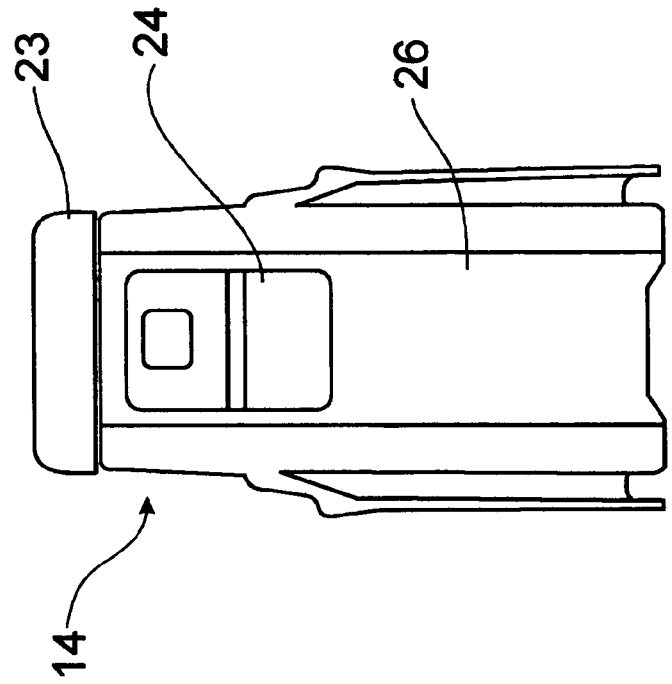
FIG. 4 is a rear elevational view of the automotive center console apparatus depicted in FIG. 1.
Figure 3:
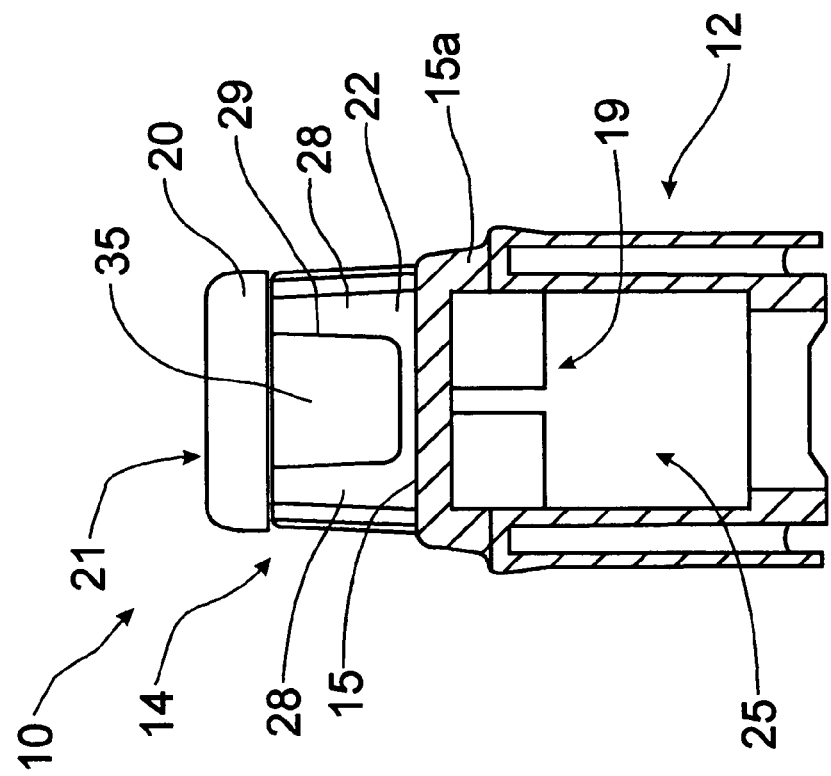
FIG. 3 is a cross-sectional view of the center console taken along lines 3-3 of FIG. 2 to depict an elevational view of the front face of the console apparatus incorporating the enlarged opening.

Referring to the drawings, a center console incorporating the principles of the instant invention for deployment in an automotive vehicle can best be seen. The console 10 is designed to be positioned in the customary location between the driver's seat and the front passenger's seat in an automotive vehicle. Preferably, the console 10 will extend from beneath the front dash (not shown) of the vehicle, or immediately rearwardly of a transmission controller, extend between the driver and front passenger seat and terminate rearwardly of these seats. The purpose of the console 10 is multi-fold. The console can serve as an arm rest, a storage facility, a cupholder, a storage tray, change holder, and other miscellaneous functions.

Figure 5:
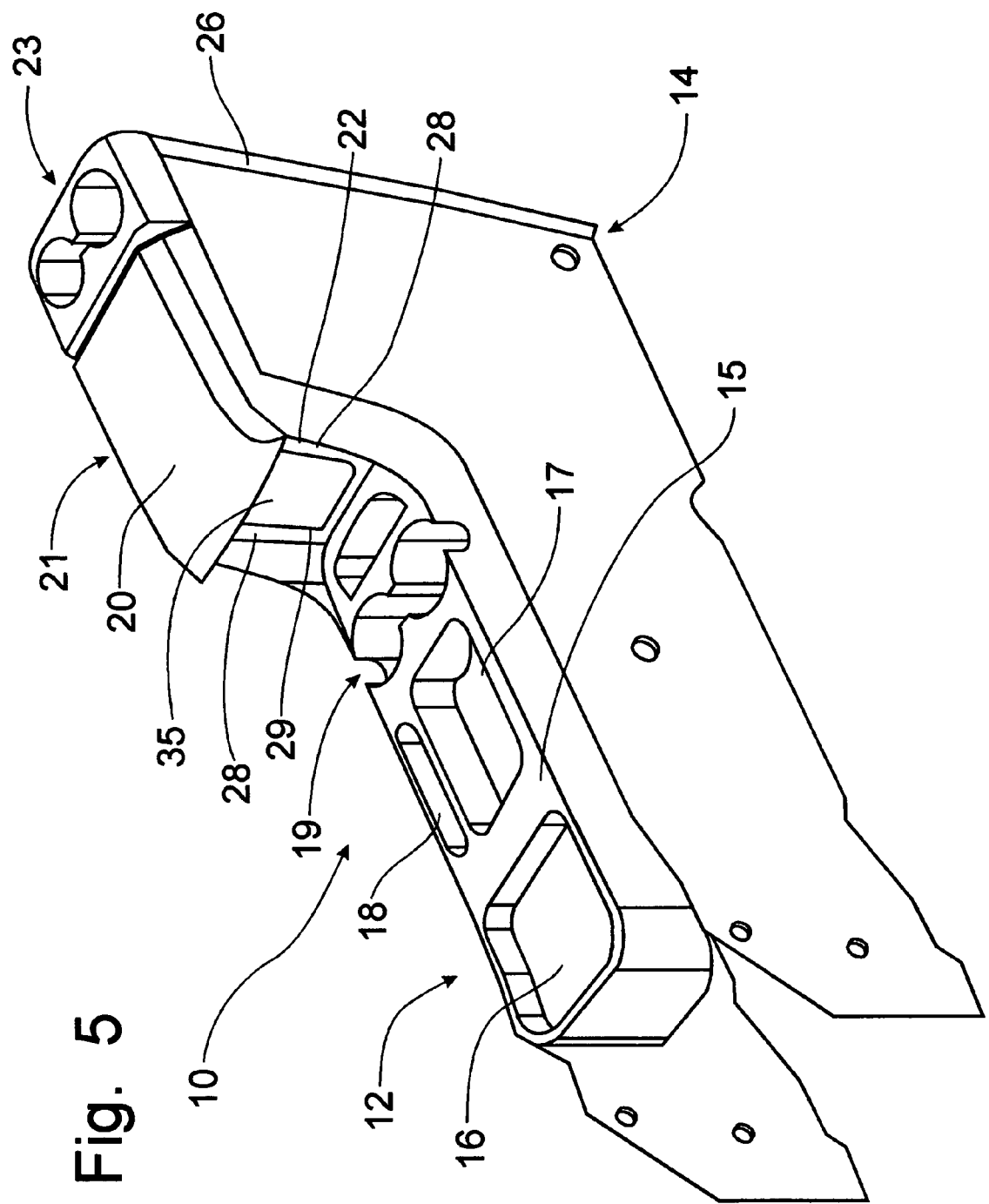
FIG. 5 is a left, front perspective view of the center console apparatus depicted in FIG. 1.

The center console 10 incorporating the principles of the instant invention has a lower profile front portion 12 and a higher profile rear portion 14. The opposing vertical sides of the console 10 extend upwardly from the floor of the vehicle and support an upper, generally horizontal surface 15 along the front portion 12. As is best seen in FIGS. 1 and 5, the top surface 15 is formed with several open storage trays 16, 17, 18 of varying sizes for restraining loose items on the top surface 15, as desired by the operator of the vehicle. The top surface 15 can also be formed with a conventional cupholder 19 immediately forwardly of the higher profile rear portion 14 and within convenient reach of an operator positioned in the driver's seat next to the center console 10.

Figure 8:
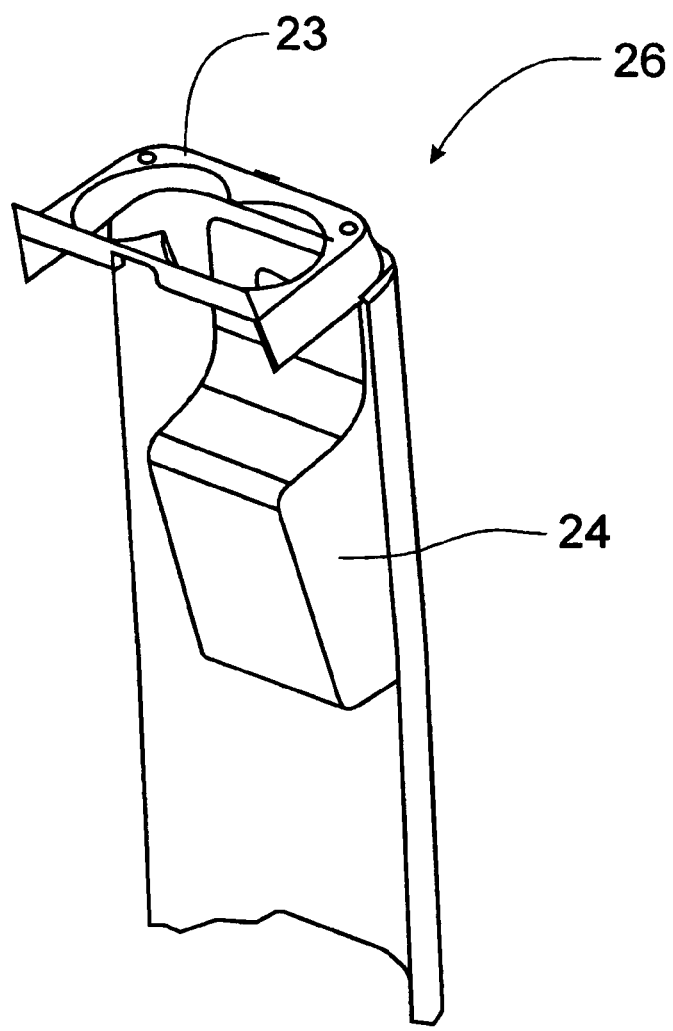
FIG. 8 is a perspective view of the rear end cap incorporating a pair of cup holders and a rear pivotable storage bin for mounting at the rearward end of the center console, as is depicted in FIGS. 1, 2 and 5.

The higher profile rear portion 14 is formed with a generally vertically oriented front face 22 that extends upwardly from the top surface 15 of the front portion and terminates beneath a pivoted lid 20, which is preferably formed with a cushioned upper surface 21 to enhance use thereof as an arm rest. Rearwardly of the pivoted lid 20, a second cupholder 24 can be provided for supplemental access by the driver and front passenger, or for primary access by any passengers positioned in the rear seats of the vehicle rearwardly of the center console 10. As can be seen in FIG. 8, the rear cupholder 23 can be formed in an end cap 26 defining the rear face of the console 10 and providing a supplemental pivoted storage bin 24 that can extend rearwardly from the end cap 26 toward the rear seats of the vehicle.

The side walls of the console 10 define a large storage receptacle 25 that underlies the top surface 15 of the front portion 12 and forms the interior of the rear portion 14. Access into the storage receptacle 25 is through the generally horizontal opening 21 underneath the pivoted lid 20. The rear end cap 26, as is shown in FIG. 8, has a vertical flange 27 that supports a hinge (not shown) to permit a vertical pivotal movement of the lid 20 between a raised open position and a lowered closed position, as is known and customary in the art.

The top of the rear portion 14, i.e. the top surfaces of the side walls, support a removable storage bin 30, best seen in FIG. 7, formed with a top flange 32 for engaging the side walls for support thereon. The removable bin 30 is of a size that covers the opening 21, but can be easily moved into position within the storage receptacle 25 at the opening 21 or completely removed therefrom through the opening 21. Once the removable storage bin 25 is positioned within the storage receptacle 25, access into the remainder of the storage receptacle 25 cannot be obtained. Thus, when the storage bin 25 is in place, the readily usable and accessible storage is limited to the size of the storage bin 25. Only by removing the storage bin 25 can the operator reach into the storage receptacle 25, which extend substantially unimpeded beneath the top surface 15 of the front portion 12.

As can be seen in FIG. 6, the front face of the rear portion 14 is preferably formed as a molded member 15a that includes the top surface 15 of the front portion 12. This molded member 15a is supported by the side walls and defines the upper surface of the storage receptacle 25. The front face 22 includes the front face opening 29, which is flanked by the remainder of the front face forming front face flanges 28 that engage with the offset ledges 37 to either side of the front panel 35 to hold the removable storage bin 30 in proper position when installed into the storage receptacle 25. A forwardly projecting handle 39 allows the operator to easily grip the removable storage bin 30 for insertion and removal of the storage bin 30 from the storage receptacle 25.

The storage receptacle 25 also extends beneath the rear cupholders 23 behind the pivoted lid 20. Furthermore, the storage receptacle 25 defines a diagonal dimension from the top of the front face 22 to the lower rear corner of the end cap 26 that is substantially greater than any dimension defined by the access opening 21 into the storage receptacle 25. Thus, the storage receptacle 25 has a capacity of holding objects therewithin that are larger than the opening 21 through which the objects would customarily have to pass to be placed into the storage receptacle 25. For example, the storage receptacle 25 can be sized to hold a conventional laptop computer (not shown) or a large purse (not shown); however, such items will not pass through the opening 21.

Figure 9:
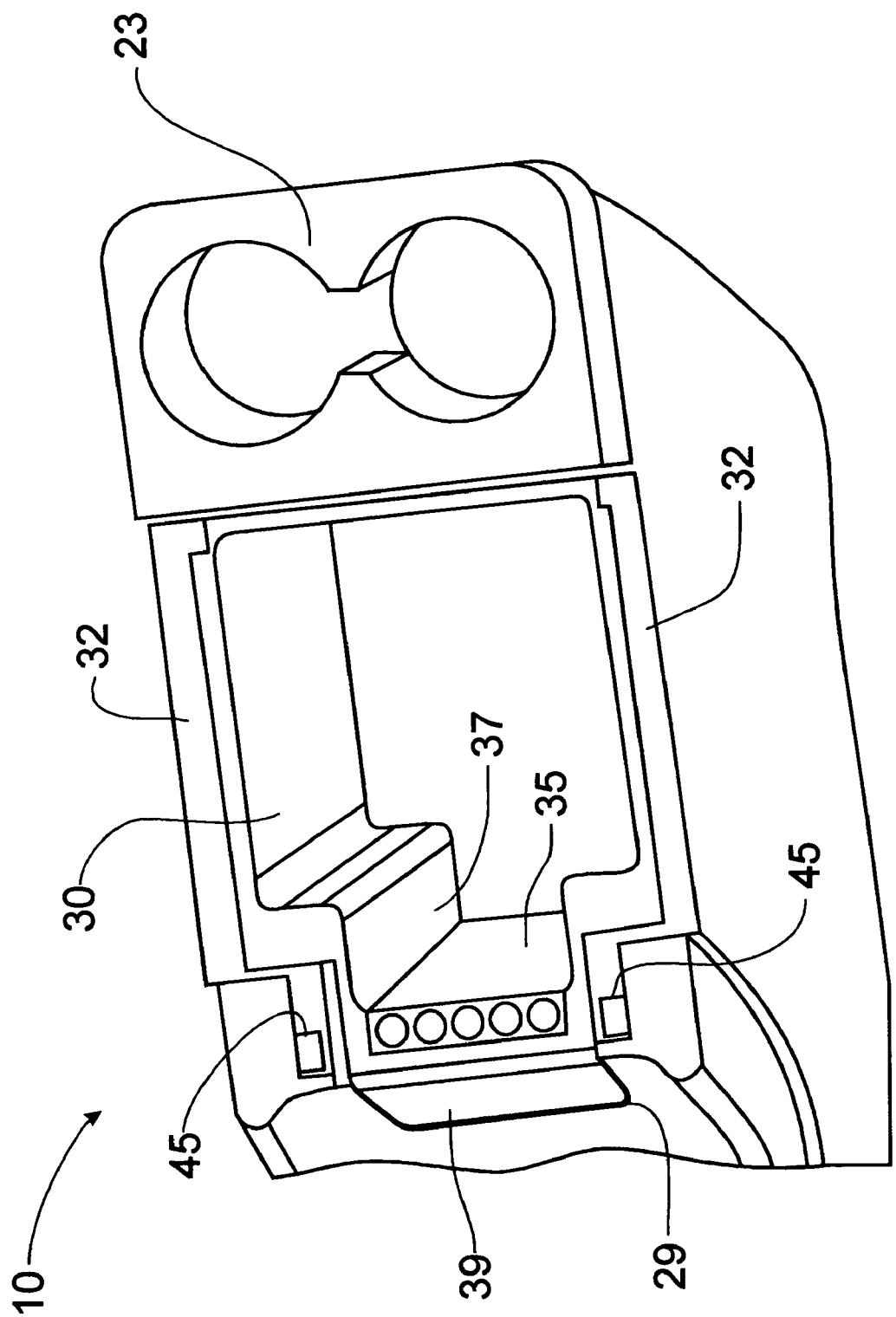
FIG. 9 is an enlarged perspective view of the rear portion of the console with the pivoted lid removed to depict the positioning of the storage bin into the storage receptacle through the access opening.

To permit an enlargement of the opening 21, the front face 22 is formed with a generally vertically oriented opening 29 that is in open communication with the horizontal opening 21. The front face, as is best seen in FIG. 9, is preferably angled slightly forwardly from a true vertical orientation. Referring now to FIGS. 5-7 and 9, the front face opening 29 is closed by the handle 39 of the removable storage bin 30 when the storage bin 30 is positioned within the storage receptacle 25 with the top flange 32 resting on the side walls. The front panel 35 and the offset ledges 37 of the storage bin 30 mate with corresponding formed housing structure constituting part of the storage receptacle. When the storage bin 30 is in place within the storage receptacle 25, as is seen in FIG. 9, the handle 39 is positioned in engagement with the front face flanges 28 while the storage bin 30 is fixed within the confining structure of the top of the storage receptacle 25 at the access opening 21.

With the storage bin 30 removed from the rear portion 14 of the console 10 and the lid 20 pivoted to the vertical opened position, the size of the combined front face opening 29 and the access opening 21 is sufficient to permit the introduction of an object the size of a laptop computer into the storage receptacle 25 for storage therein. Replacement of the removable storage bin 30 and a latching of the pivoted lid into the horizontal closed position, keeps the large object within the storage receptacle 25 out of sight from externally of the console 10.

Figure 12:
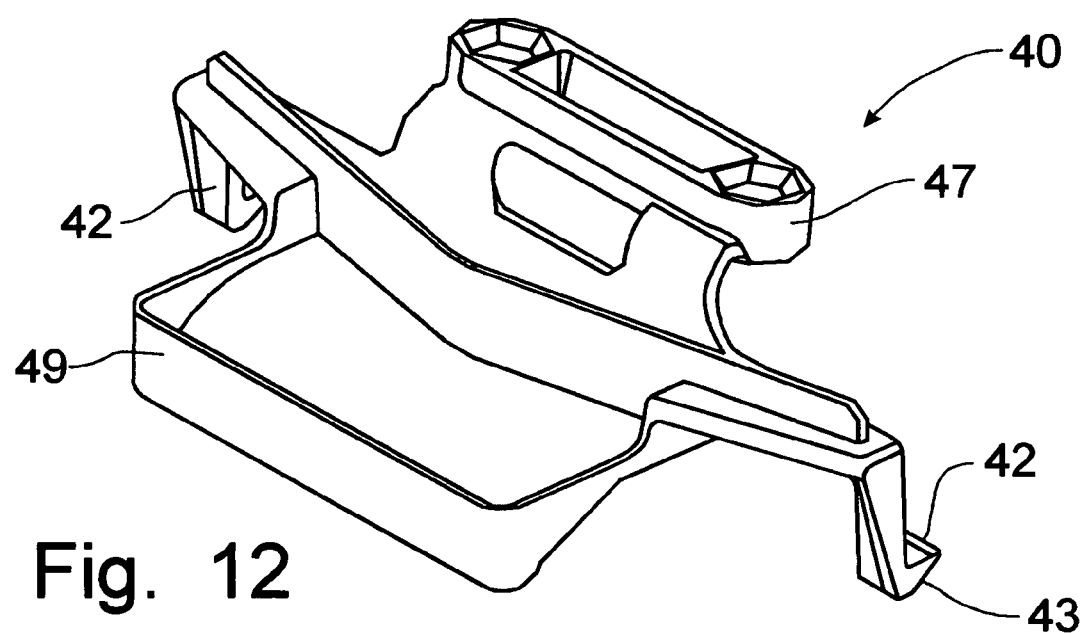
FIG. 12 is an upper, rear perspective view of the latch member shown in FIG. 10.
Figure 10:
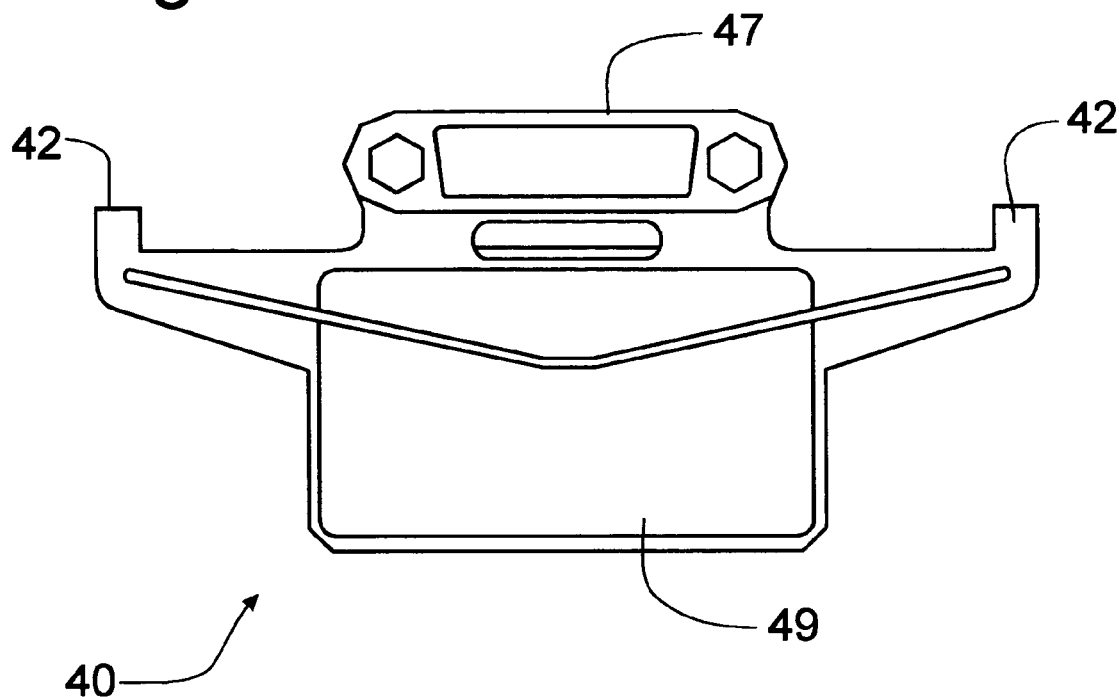
FIG. 10 is an enlarged front elevational view of the latch member supported on the pivoted lid.
Figure 11:
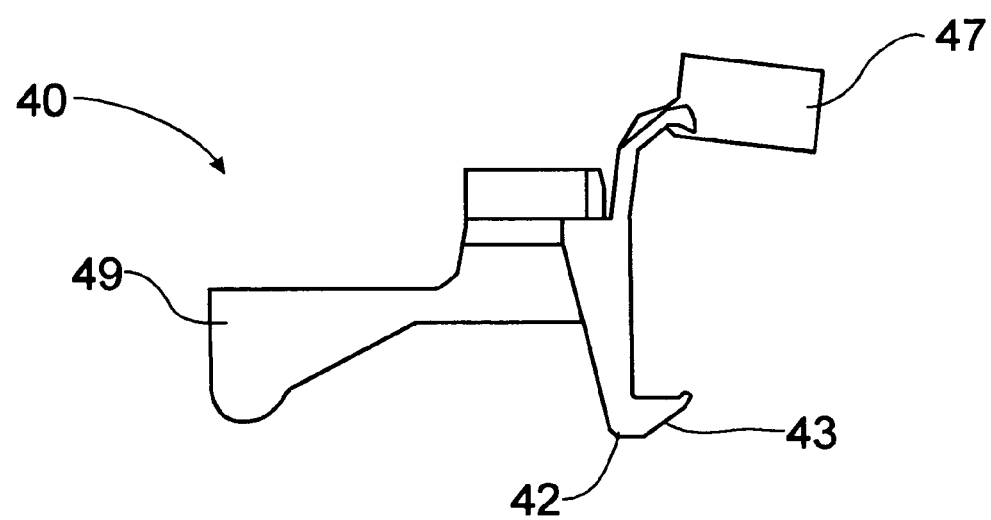
FIG. 11 is a side elevational view of the latch member shown in FIG. 10.
Figure 13:
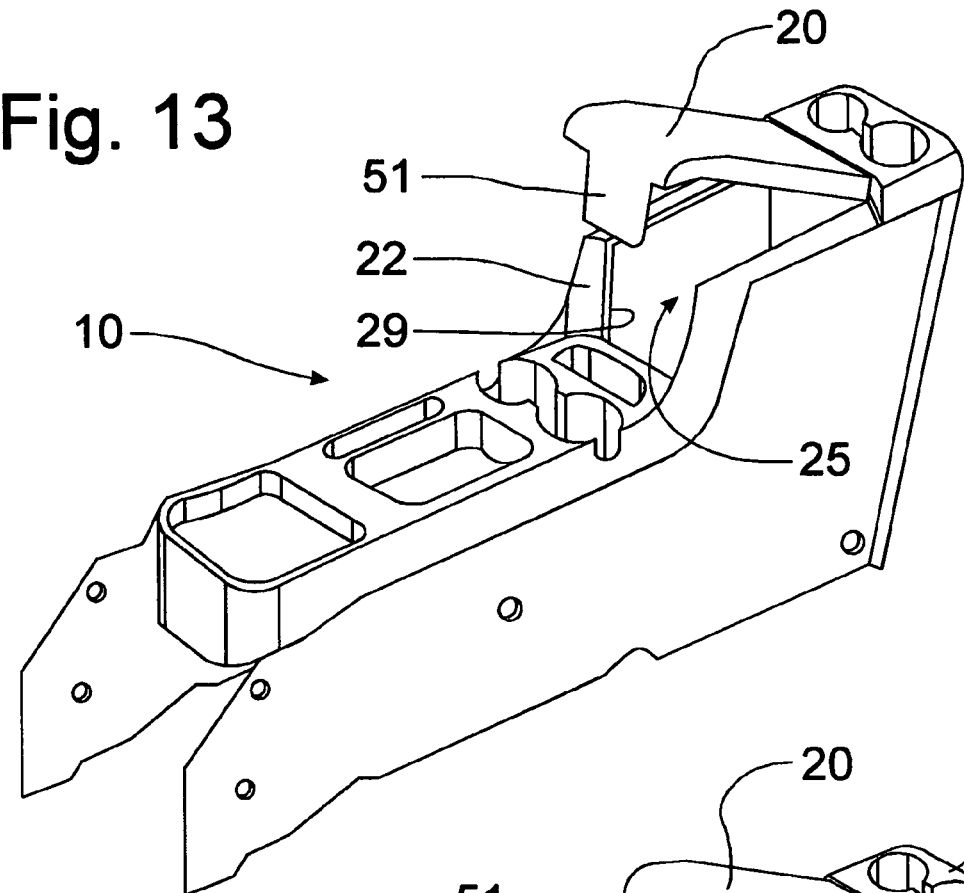
FIG. 13 is a left, front perspective view of the center console apparatus similar to that of FIG. 5, but depicting an alternative embodiment of the pivoted lid to incorporate an integrated wall to close the front face opening, the pivotal movement of the integrated wall being shown in phantom.

The latch mechanism is best seen in FIGS. 10-12. The latch 40 is mounted on the underside of the lid 20 such that the latch hooks 42 projected downwardly for engagement into and with the latch openings 45 formed in the housing structure of the side walls of the console 10 at the access opening 21. The cam surface 43 on the outer front surface of the latch hooks 42 causes the latch hooks 42 to deflect when coming into engage with the edges of the corresponding latch openings 45, thus allowing the latch hooks 42 to be inserted into the latch openings 45. The engagement of the latch hooks 42 with the side walls through the latch openings 45 restrains the pivoted lid 20 in the generally horizontal closed position. To affect an opening of the latch 40 to allow the pivoted lid 20 to move to an opened position, the handle 47 need only be deflected downwardly to cause a corresponding rearward flexing of the latch hooks 42 and cause the latch hooks 42 to disengage the side walls and allow movement thereof back out through the latch openings 45. To help locate the pivoted lid 20 and to keep the latch hooks 42 aligned with the latch openings 45, the body portion 49 of the latch 40 is formed to mate with the storage bin 30 between the offset ledges 37.

In operation, the removable storage bin 30 is located within the storage receptacle 25 beneath the pivoted lid/arm rest 20. Convenient access can be had into the storage bin 30 by simply raising the lid 20 and reaching into the storage bin 30. To access the larger storage receptacle 25 beneath the storage bin 30, the storage bin 30 must be removed by grasping the handle 39 and lifting the storage bin 30 out through the access opening 21, thus exposing the combined front face opening 29 and the access opening 21. Objects can then be inserted or removed from the larger storage receptacle 25 through the combined front face opening 29 and access opening 21. The return of the storage bin 30 into its stowed position within the storage receptacle on top of the side walls, again closes the front face opening until needed. In the event the object placed into the storage receptacle 25 is too large to permit the reinsertion of the storage bin 30 into the rear portion 14 of the console 10, the pivoted lid 20 can still be closed, providing the movement of the lid 20 is not in interference, thus leaving the front face opening 29 open. Since the front face opening 29 is generally vertically oriented, visual inspection of the interior of the storage receptacle 25 is very limited when the lid 20 is closed even though the front face opening 29 remains open into the storage receptacle 25.

Figure 14:
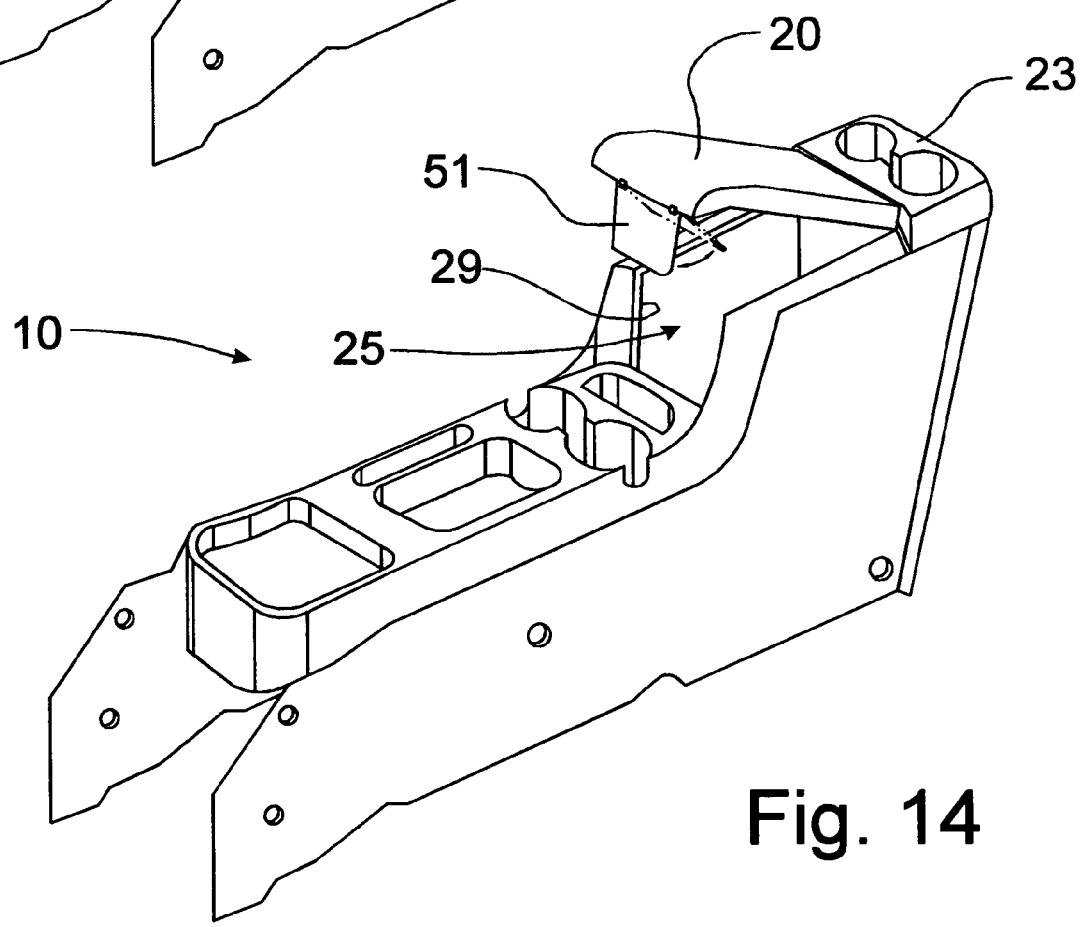
FIG. 14 is a left, front perspective view of the center console apparatus similar to that of FIG. 13, but disclosing a second alternative embodiment wherein the integrated wall is pivotally connected to the pivoted lid.

While the preferred embodiment of the invention utilizes the handle 39 of the storage bin 30 to fill the front face opening 29, other devices can be employed to selectively close the front face opening 29. For example, the front face opening 29 can be closed with an integrated panel 51 formed as part of the pivoted lid 20 so that when the pivoted lid 20 is closed to close off the access opening 21, the integrated panel 51 seats against the front face 22 to close off the front face opening 29. As is depicted in FIG. 14, the integrated panel 51 could be pivotally supported on the pivoted lid 20 to provide additional clearance into the storage receptacle 25 when the pivoted lid 20 is raised.

Figure 15:
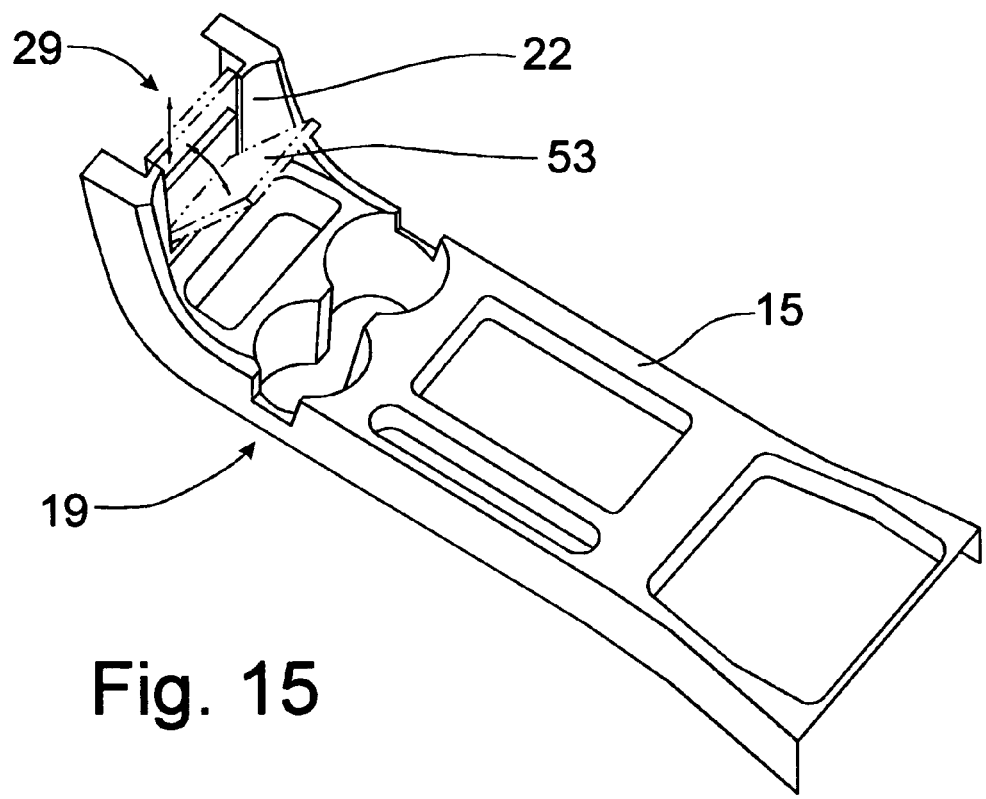
FIG. 15 is a right, front perspective view of the top surface molding forming part of the center console apparatus, similar to that of FIG. 6 but showing a third alternative embodiment of a pivoted panel supported on the front face for movement to selectively open the front face opening into the storage receptacle, the movement of the pivoted panel being shown in phantom.
Figure 16:
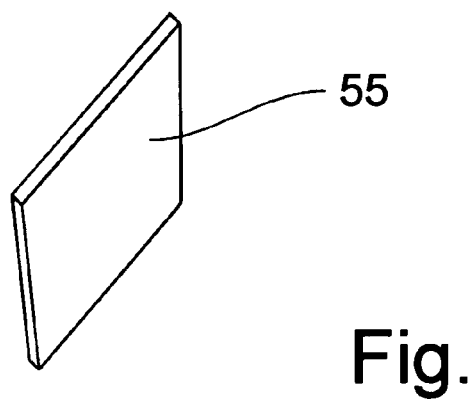
FIG. 16 is a perspective view of a removable panel forming a fourth alternative embodiment of a closure device for the front face opening into the storage receptacle.

The panel closing the front face opening 29 can be an independently movable member, as is depicted in FIG. 15 wherein a pivoted panel 53 is shown. The pivoted panel 53 can be pivotally connected to the front face 22, or perhaps on the top surface 15, to provide independent movement thereof for access through the front face opening 29. A suitable latch (not shown) would preferably be utilized to restrain the pivoted panel 53 in the upright position closing off the front face opening 29. This panel could be completely removable, as is depicted in FIG. 16, in which a removable panel 55 is shown. Instead of pivoting the panel away, whether attached to the pivoted lid 20, as is depicted in FIG. 14, or attached to the front face 22, as is depicted in FIG. 15, the removable panel 55 could be completely detached from the front portion 12 of the console 10. Again suitable latching devices (not shown) would preferably be provided to restrain the removable panel 55 in the engaged position closing off the front face opening 29.

In such an alternative embodiments, the storage bin 30, if incorporated into the console 10, would be shaped differently so as to not have the handle 39 projecting outwardly for engagement with the front face 22, as is shown in the drawings. Thus, with these alternative embodiments, when the front face opening 29 is desired to be opened, the pivoted lid 20 would be raised, the storage bin 30 removed (if present within the storage compartment 25), and the closure panel 53, 55 moved by removal or by pivoting, as appropriate, to enlarge the access opening 21 with the addition of the opened front face opening 29.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

The invention claimed is:

1. A center console for an automotive vehicle comprising:
   a front portion having opposing exterior side walls supporting a top surface positioned at a first height;
   a rear portion having a pivoted lid supported on said side walls at a second height greater than said first height, said rear portion including an exterior front face extending generally vertically above said top surface of said front portion, between said side walls and terminating beneath said pivoted lid, said pivoted lid closing a generally horizontally oriented access opening;
   said rear portion defining a storage receptacle within said console between said side walls and beneath said pivoted lid of said rear portion, said access opening being in communication with said storage receptacle; and
   said front face being formed with a generally vertical front face opening that is in communication with said access opening and with said storage receptacle, thus permitting objects of a size greater than said access opening to be introduced into said storage receptacle.

2. The center console of claim 1 further comprising a removable storage bin positionable within said storage receptacle to be in communication with said access opening.

3. The center console of claim 2 wherein said removable storage bin has a front handle that is engagable with said front face to close said front face opening when said storage bin is positioned within said storage receptacle.

4. The center console of claim 1 wherein said pivoted lid is formed with an integrated wall that is positionable with said front face to close said front face opening when said pivoted lid is positioned to close said access opening.

5. The center console of claim 1 wherein said top surface includes a pivoted panel movable into an upright position that engages said front face to selectively close said front face opening, said pivoted panel being pivotable into a lowered position to open said front face opening for access into said storage receptacle.

6. The center console of claim 1 further comprising a removable panel positionable in engagement with said front face to selectively close said front face opening, said removable panel being removable from said front face to open said front face opening for access into said storage receptacle.

7. The center console of claim 3 wherein said storage bin is formed with a top flange that supports said storage bin on said side walls, said front face including front face flanges located on opposing sides of said front face opening, said front face flanges being engagable with offset ledges formed in said storage bin on opposing sides of a front panel of said storage bin to properly position said storage bin within said storage receptacle.

8. The center console of claim 7 further comprising a rear end cap affixed to said side walls and incorporating a rear cupholder located rearwardly of said pivoted lid.

9. The center console of claim 8 wherein said rear end cap also includes a pivoted supplemental storage bin that opens rearwardly from said rear end cap.

10. In a center console for use in an automobile, said center console having spaced apart side walls and a top surface defining a storage receptacle therein, said center console including a front portion in which a first corresponding portion of said top surface is at a first height and a rear portion in which a second corresponding portion of said top surface is at a second height greater than said first height, said rear portion having a front face extending upwardly from said first portion of said top surface to said second portion of said top surface, said second portion of said top surface including a pivoted lid closing a generally horizontally extending access opening in communication with said storage receptacle, the improvement comprising:
    said front face is formed with a generally vertically extending front face opening in communication with said access opening; and
    a device selectively movable for opening and closing said front face opening independently of said pivotable lid covering said access opening such that the opening of said front face opening and said access opening simultaneously permits an object larger than said access opening to be inserted into said storage receptacle.

11. The center console of claim 10 wherein said device is a removable storage bin positionable within said storage receptacle and having a front handle positionable within said front face opening to close said opening, said storage bin being selectively movable through said access opening to open and close said front face opening.

12. The center console of claim 10 wherein said pivoted lid is formed with an integrated wall that is positionable with said front face to close said front face opening when said pivoted lid is positioned to close said access opening.

13. The center console of claim 10 wherein said top surface includes a pivoted panel movable into an upright position that engages said front face to selectively close said front face opening, said pivoted panel being pivotable into a lowered position to open said front face opening for access into said storage receptacle.

14. The center console of claim 10 further comprising a removable panel positionable in engagement with said front face to selectively close said front face opening, said removable panel being removable from said front face to open said front face opening for access into said storage receptacle.

15. The center console of claim 10 wherein said storage bin includes a top flange engagable with said side walls of said rear portion to support said storage bin at said access opening with said front panel positioned within said front face opening.

16. The center console of claim 15 wherein said front face includes front face flanges located on opposing sides of said front face opening, said removable storage bin having offset ledges on opposing sides of said front panel for engagement with said front face flanges to locate said front handle in said front face opening.

17. The center console of claim 10 further comprising a rear end cap affixed to said side walls and incorporating a rear cupholder located rearwardly of said pivoted lid and a pivoted supplemental storage bin that opens rearwardly from said rear end cap.

18. A center console for an automotive vehicle, said center console having spaced apart side walls and a top surface defining a storage receptacle therein, said center console further having a front portion and a rear portion, said rear portion being formed with a generally horizontally oriented access opening in communication with said storage receptacle, comprising:
    said rear portion including a front face having a generally vertically oriented front face opening formed therein and being in open communication with said access opening;
    a removable storage bin positionable within said storage receptacle at said access opening and having a front handle positionable within said front face opening to close said opening, said storage bin being selectively movable through said access opening to open and close said front face opening so that the opening of said front face opening and said access opening simultaneously permits an object larger than said access opening to be inserted into said storage receptacle.

19. The center console of claim 18 wherein said front face includes front face flanges located on opposing sides of said front face opening, said removable storage bin having offset ledges on opposing sides of said front panel for engagement with said front face flanges to locate said front handle in said front face opening.

20. The center console of claim 19 wherein said storage bin includes a top flange engagable with said side walls of said rear portion to support said storage bin at said access opening with said front panel positioned within said front face opening.

* * * * *